United States Patent
Wilson et al.

(10) Patent No.: US 6,178,166 B1
(45) Date of Patent: *Jan. 23, 2001

(54) METHOD AND APPARATUS FOR GROUP CALLS IN A WIRELESS CDMA COMMUNICATION SYSTEM

(75) Inventors: Timothy J. Wilson, Rolling Meadows; Hua Xu, Lake Zurich, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/322,649

(22) Filed: May 28, 1999

(51) Int. Cl.[7] ............................. H04B 7/216; H04B 7/00
(52) U.S. Cl. ......................... 370/335; 370/342; 455/518
(58) Field of Search ...................................... 370/335, 342, 370/260; 455/445, 450, 38.1, 38.3, 517, 518, 519, 522, 68, 69, 70; 375/200

(56) References Cited

U.S. PATENT DOCUMENTS

| | | | |
|---|---|---|---|
| 5,216,692 | * | 6/1993 | Ling ..................................... 375/200 |
| 5,691,979 | * | 11/1997 | Cadd et al. ........................... 370/312 |
| 5,914,958 | * | 6/1999 | Chinitz et al. ....................... 370/441 |
| 6,005,848 | * | 12/1999 | Grube et al. ......................... 370/266 |

* cited by examiner

*Primary Examiner*—Alpus H. Hsu
*Assistant Examiner*—Afsar M. Qureshi
(74) *Attorney, Agent, or Firm*—Jeffrey K. Jacobs

(57) ABSTRACT

The present invention provides a method and apparatus for group calls in wireless CDMA communication systems, addressing the need for reliable and efficient reverse power control in CDMA group calls. A communication infrastructure (108–110) upon receiving a group call request from a communication unit (e.g., 103), allocates a single voice channel (e.g., 120–121) in each cell that provides service to one or more communication units of the group (101). The communication infrastructure further allocates a reverse power control channel (e.g., 125–127) to each communication unit of the group. Thus, each communication unit of the group receives voice information for the group call via the voice channel in that communication unit's site or cell, and each communication unit receives inbound (i.e., reverse) power control information via the reverse power control channel allocated to that communication unit. In this manner, the present invention efficiently provides reverse power control information to multiple communication units and, therefore, facilitates the establishment of group calls in CDMA systems.

20 Claims, 3 Drawing Sheets

METHOD AND APPARATUS FOR GROUP CALLS IN A WIRELESS CDMA COMMUNICATION SYSTEM

CROSS-REFERENCE TO RELATED APPLICATION

Related subject matter is disclosed in prior co-pending, commonly assigned patent applications entitled "Method and Apparatus for Group Calls In a Wireless CDMA System" Ser. No. 09/065,314 filed Apr. 23, 1998, now pending, "Establishment of Multiple Low-Rate Inbound Signaling Links in CDMA Dispatch System" Ser. No. 08/959,327, now U.S. Pat. No. 6,115,388, "Fast Call Setup In a CDMA Dispatch System" Ser. No. 08/959,152 now U.S. Pat. No. 5,914,958, both filed Oct. 28, 1997, and "Method and Apparatus for a Talkgroup Call In a Wireless CDMA System" Ser. No. 08/958,041 now U.S. Pat. No. 6,005,848 filed Oct. 27, 1997, which prior applications are hereby incorporated by reference verbatim, with the same effect as though the prior applications were fully and completely set forth herein.

FIELD OF THE INVENTION

The present invention relates generally to the field of wireless communications and, more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use both frequency division multiple access (FDMA) and time division multiple access (TDMA) methods to rebroadcast transmissions.

In a system that supports dispatch group calls, the communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in any necessary sites to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talk group members are typically in a listen only mode (i.e., not able to transmit when another member is talking) and thus are not allocated a dedicated reverse link. In a TDMA system, for example, time slots are allocated to different users. A talk group member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as code division multiple access (CDMA), has proved to be an alternative for serving large populations of multiple access users over analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a system supporting dispatch group calls. The difficulties in applying CDMA techniques to dispatch group communications (such as forward and reverse power control and the need to support soft hand-offs) are discussed in co-pending patent applications "Establishment of Multiple Low-Rate Inbound Signaling Links in CDMA Dispatch System" Ser. No. 08/959,327 and "Fast Call Setup In a CDMA Dispatch System" Ser. No. 08/959, 152. In addressing these problems, both of these prior applications discuss the establishment of a low-rate (non-voice) signaling link in the reverse direction (inbound). Using such a low-rate inbound signaling link, which signals at a predetermined rate substantially less than that of a full-rate traffic link, proportionately less average power is required for dispatch communications than would otherwise be the case if full-rate traffic links were provided instead to non-talking talkgroup members. Additionally, it is recognized in these prior applications that such low-rate reverse links can be used to maintain the correct reverse link power control for each non-talking member to allow for fast channel access for any follow-on calls (i.e., group-wide calls initiated by non-talking members following a current group call transmission).

While reverse links for dispatch group calls can be used to facilitate reverse power control, substantial difficulties must be overcome. In particular, it must be recognized that in existing CDMA systems, reverse power control is maintained in accordance with information sent over a forward (outbound) channel. In particular, existing CDMA systems use in-band control signaling (i.e., control signaling embedded in an outbound traffic channel) to continuously instruct individual communication units how to adjust their reverse power, typically up to 800 times per second. This method works well for one-to-one type calls. However, this method quickly breaks down for one-to-many type calls. In particular, the amount of information required to continuously update even a modest number of non-talking members in a group call would occupy too much of a given outbound traffic channel's bandwidth, leaving little, if any, bandwidth for the actual outbound traffic. Additionally, because the outbound traffic channel in a group call scenario would not be assigned to a single user, as in one-to-one type calls, it becomes necessary to direct specific reverse power control information to each of the non-talking members.

Thus, there exists a need to provide reliable and efficient reverse power control for group call communication in CDMA systems.

DESCRIPTION OF A PREFERRED EMBODIMENT

Figure 1:
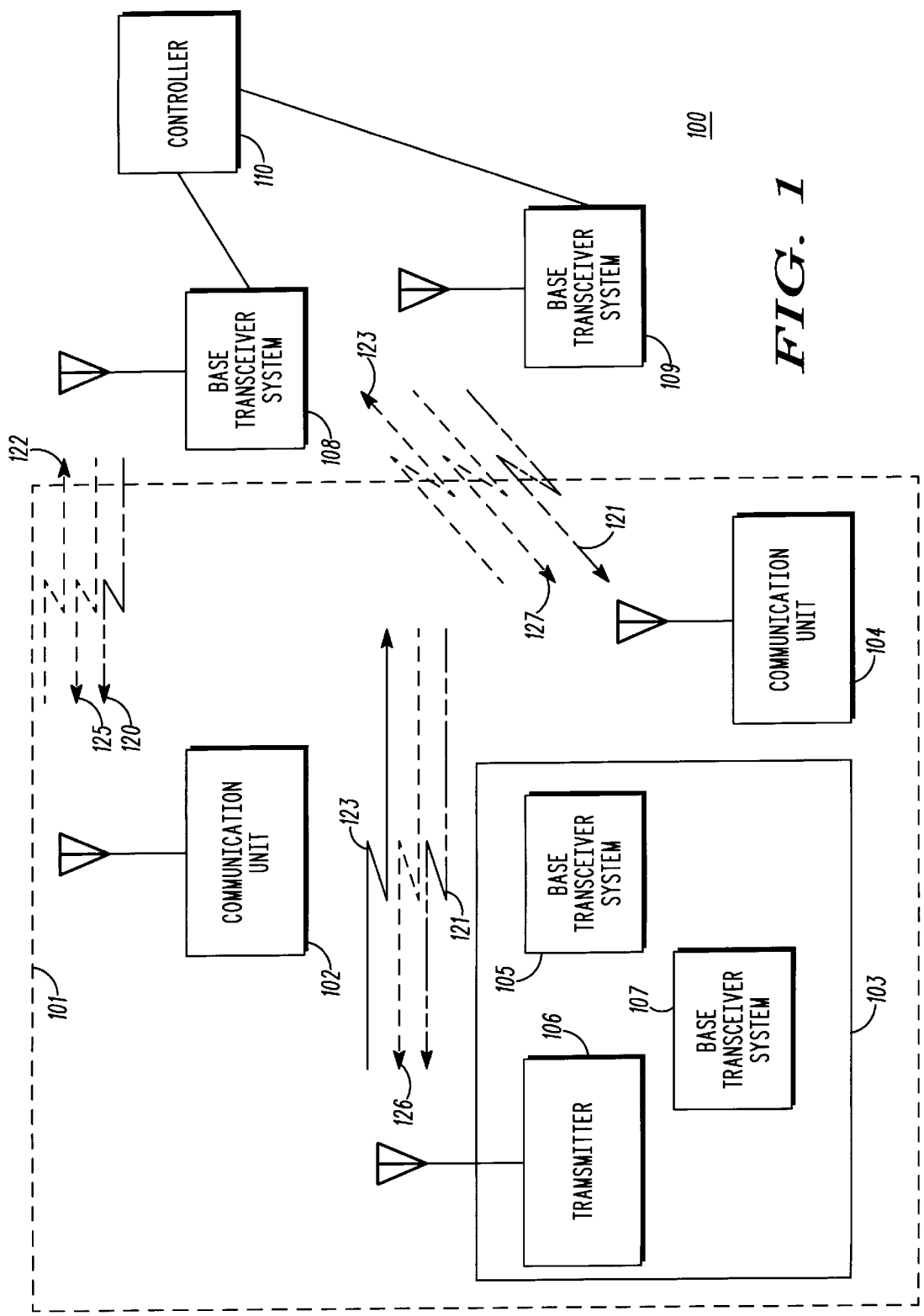
FIG. 1 is a block diagram depiction of a wireless CDMA communication system in accordance with a preferred embodiment of the present invention.

The present invention provides a method and apparatus for group calls in wireless CDMA communication systems, addressing the need for reliable and efficient reverse power control in CDMA group calls. A communication infrastructure, upon receiving a group call request from a communication unit, allocates a single voice channel in each cell that provides service to one or more communication units of the group. The communication infrastructure further allocates a reverse power control channel to each communication unit of the group. Thus, each communication unit of the group receives voice information for the group call via the voice channel in that communication unit's site or cell, and each communication unit receives inbound (i.e., reverse) power control information via the reverse power control channel allocated to that communication unit. In this manner, the present invention efficiently provides reverse power control information to multiple communication units and, therefore, facilitates the establishment of group calls in CDMA systems.

The present invention encompasses a method for a wireless CDMA communication infrastructure to establish a group call. The wireless CDMA communication infrastructure comprises a plurality of base transceiver systems (BTSs), and each BTS, of the plurality of BTSs, provides wireless communication service to any communication unit, of a plurality of communication units, that is in the service coverage area of that BTS. The communication infrastructure receives, from a requesting communication unit of the group, a request for a group call with other communication units of a group, wherein at least a subset of the plurality of communication units are logically arranged into the group. The communication infrastructure allocates a single voice channel for the group call at each BTS of the plurality of BTSs that is providing communication service to at least one communication unit of the group. The communication infrastructure further allocates a power adjustment channel for the group call for each communication unit of the group at the BTS, of the plurality of BTSs, that is providing communication service to that communication unit.

Additionally, the present invention encompasses a method for a communication unit, of a plurality of communication units that are logically arranged into a group, to participate in a group call with the other communication units of the group, wherein a wireless CDMA communication infrastructure provides wireless communication service to the communication unit. The communication unit receives, from the wireless CDMA communication infrastructure, voice information corresponding to a group call via a voice channel allocated for the group call. The communication unit receives, from the wireless CDMA communication infrastructure, inbound power adjustment information via a power adjustment channel uniquely allocated for the communication unit, wherein the power adjustment channel and the voice channel are separate CDMA channels. The communication unit further transmits, to the wireless CDMA communication infrastructure, outbound power adjustment information corresponding to the voice channel and to the power adjustment channel.

Additionally, the present invention encompasses a wireless CDMA communication infrastructure that comprises a first BTS that receives, from a requesting communication unit of a group of communication units, a request for a group call with the other communication units of the group. The communication infrastructure comprises a second BTS that provides wireless communication services to at least one communication unit of the group of communication units. The communication infrastructure further comprises a controller, coupled to the first BTS and the second BTS, that allocates a single voice channel for the group call at the first BTS and a single voice channel at the second BTS, and that allocates a single power adjustment channel for the group call for each communication unit of the group.

The present invention also encompasses a communication unit that comprises a transmitter and a receiver. The receiver receives, from a wireless CDMA communication infrastructure, voice information corresponding to a group call via a voice channel allocated for the group call and receives, from the wireless CDMA communication infrastructure, inbound power adjustment information via a power adjustment channel uniquely allocated for the communication unit, wherein the power adjustment channel and the voice channel are separate CDMA channels. The communication unit further comprises a processor, coupled to the transmitter and the receiver, that instructs the transmitter to transmit, to the wireless CDMA communication infrastructure, outbound power adjustment information corresponding to the voice channel and to the power adjustment channel.

Figure 2:
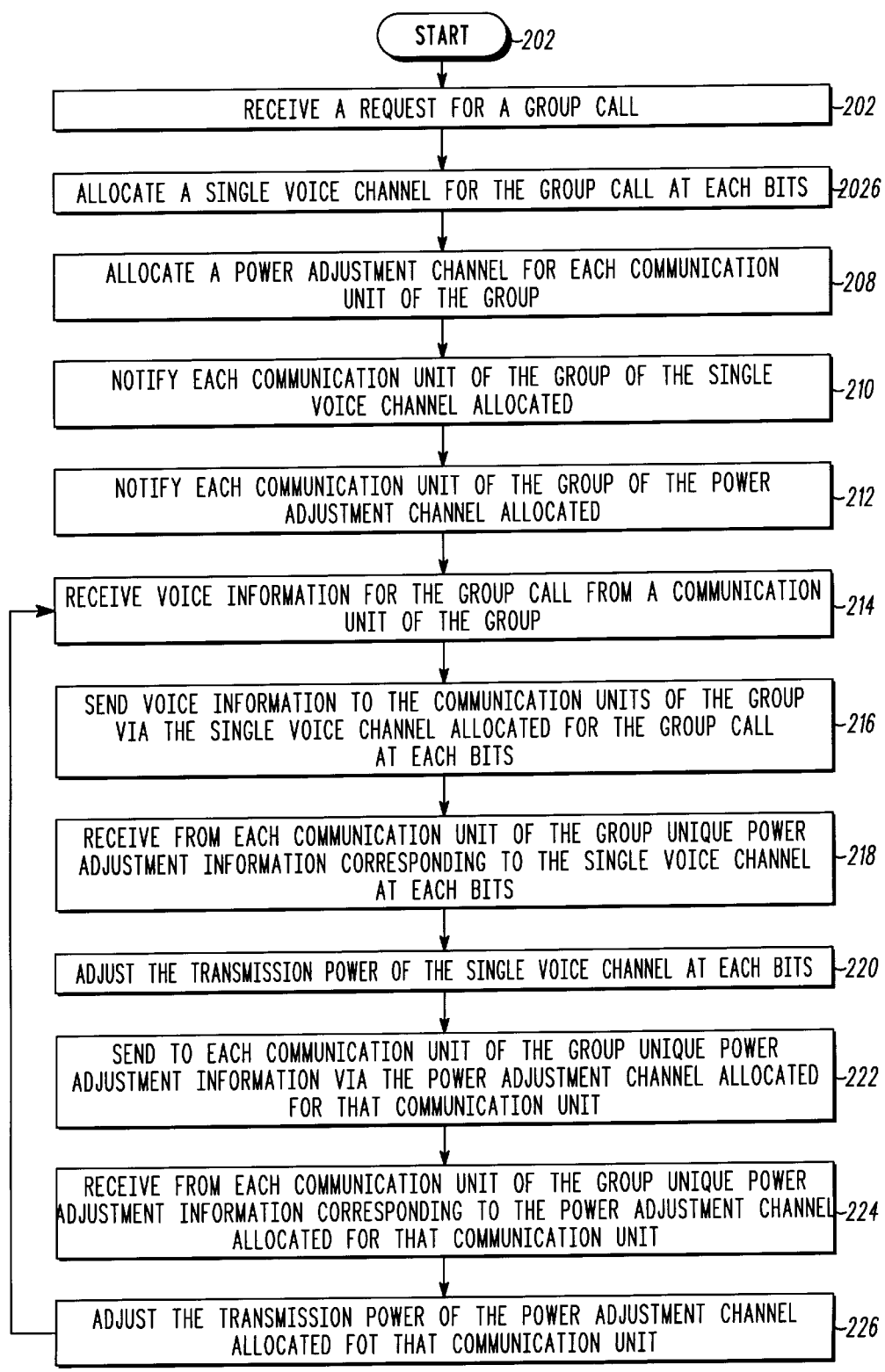
FIG. 2 is a logic flow diagram of steps executed by a wireless CDMA communication infrastructure in accordance with a preferred embodiment of the present invention.
Figure 3:
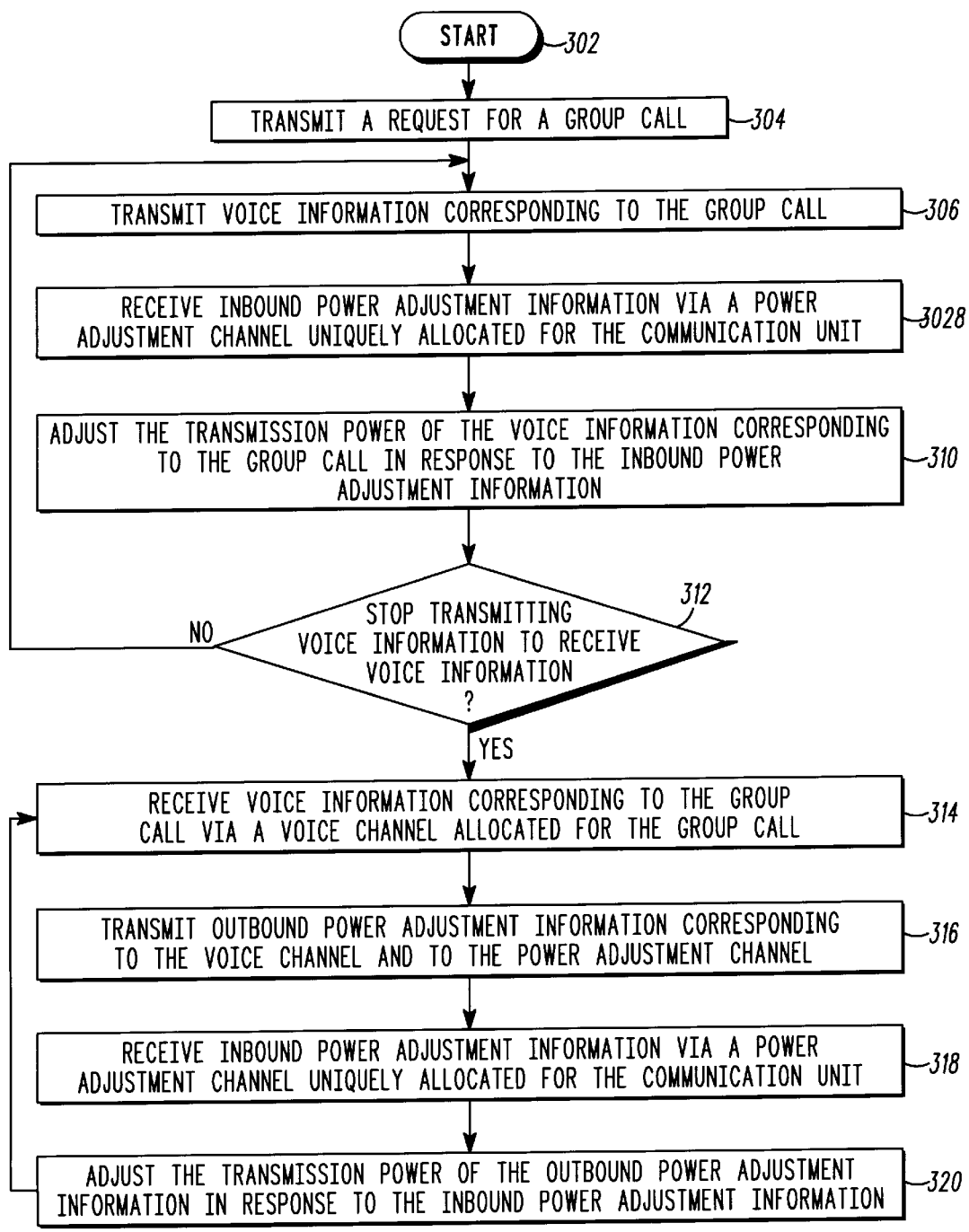
FIG. 3 is a logic flow diagram of steps executed by a communication unit in accordance with a preferred embodiment of the present invention.

The present invention can be more fully understood with reference to FIGS. 1–3. FIG. 1 is a block diagram depiction of a wireless CDMA communication system in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art, and comprises a plurality of communication units 102–104 arranged into at least one talkgroup 101 in wireless communication with a wireless CDMA communication infrastructure 108–110. In the preferred embodiment, each of the communication units 102–104 is physically capable of duplex communications, although during typical group communications, only a single communication unit is transmitting at a time.

The fixed infrastructure comprises those elements normally required to support communications within the wireless system 100 and, in the preferred embodiment, conforms to a typical CDMA architecture. In particular, the wireless CDMA communication infrastructure comprises a controller 110 that is in communication with base transceiver systems (BTSs) 108–109. The controller 110 (often referred to as a Base Station Controller or BSC) and BTSs 108–109 are all well-known in the art. In practice, the controller 110 typically communicates with a switch, one or more other controllers, and additional infrastructure equipment not shown. For purposes of simplicity, the communication infrastructure has been limited as shown in FIG. 1.

The communication infrastructure performs group call processing, which includes the method described relative to FIG. 2. In the preferred embodiment, the controller 110, under the control of software algorithms stored in memory, performs the management of the group call processing. Accordingly, the BTSs 108–109, also under the control of software algorithms stored in memory, manage the wireless CDMA interface with the communication units 102–104.

Each of the communication units 102–104 comprises a common set of elements. In particular, a processor 107, which typically comprises one or more processing devices (e.g., microprocessors, digital signal processors, etc.) and memory devices, is coupled to a transmitter 106 and a receiver 105. Each of these elements is well-known in the art. In the preferred embodiment, under the control of software algorithms stored in the memory devices of processor 107 and in cooperation with the other elements shown, the processor 107 performs those tasks required for operation of the communication unit, including the method described relative to FIG. 3.

Communication channels, such as channels 120–127, are effectively provided through the use of codes using well-known techniques, e.g., through a combination of orthogonal Walsh codes and pseudorandom noise (PN) sequences as in conventional cellular CDMA systems. When processing a group call, one or more outbound codes are used to effectively provide outbound traffic channels 120–121 to the communication units of talkgroup 101. Additionally, the present invention uses individual inbound codes to provide inbound traffic channels 122–124 from each communication unit in the talkgroup 101. Such inbound traffic channels, as discussed in co-pending patent applications "Establishment of Multiple Low-Rate Inbound Signaling Links in CDMA Dispatch System" Ser. No. 08/959,327, "Fast Call Setup In a CDMA Dispatch System" Ser. No. 08/959,152, and "Method and Apparatus for a Talkgroup Call In a Wireless CDMA System" Ser. No. 08/958,041, can be low-rate links (e.g., 122 and 124) or, in the alternative, can be full-rate traffic channels (e.g., 123). Also, the present invention provides, through the use of unique codes, power adjustment channels 125–127 to each communication unit in the talkgroup 101, the use of which is discussed in further detail below.

In the example illustrated in FIG. 1, multisite operation is shown, i.e., where the communication units corresponding to the group are spread out among more than one site or cell. In particular, the outbound traffic channel 121, inbound traffic channel 123, and power adjustment channel 126 are provided to the communication unit 103 via BTS 109 using codes unique within that BTS. Additionally, the outbound traffic channel 120, inbound traffic channels 122 and power adjustment channel 125 are provided to the communication unit 102 via BTS 108 using codes that are unique within BTS 108 and, depending on various system parameters such as geographic site separation, possibly the same as the codes used by BTS 109. Of course, it is possible that all communication units corresponding to a group could be located within a single site or cell, in which case a single BTS would be used to provide the channels.

Operation of the preferred wireless CDMA communication system 100, in accordance with the present invention, occurs substantially as follows. The BTS 109, a first BTS, provides wireless communication services to the communication units 103-104, and BTS 108, a second BTS, provides wireless communication services to the communication unit 102. The BTS 109 receives, from a requesting communication unit 103, a request for a group call with the other communication units of the group 101. The controller 110 then allocates, for the group call, a single voice channel 121 at the BTS 109, a single voice channel 120 at the BTS 108, and a single power adjustment channel 125–127 for each communication unit of the group 101.

The controller 110 allocates the power adjustment channels by reserving one or more codes. (The particular form of the code, i.e., a Walsh code, pseudorandom code, etc. is not relevant to the present invention. The only requirement is that the selected codes provide unique channels.) In practice, more than one code will be used because even if the communication units that make up the group, or talkgroup, are distributed throughout many different cells, i.e., the coverage areas defined by separate BTSs, a different code must be used in each cell in order to minimize any interference.

The communication unit 103, having initiated the group call by sending the group call request, begins the call by transmitting voice information (i.e., encoded user speech) using techniques well-known in the art. The processor 107 instructs the transmitter 106 to transmit, voice information corresponding to the group call to the BTS 109 via inbound traffic channel 123. In response to the inbound traffic channel transmission, the receiver 105 receives from the BTS 109 inbound (reverse) power adjustment information via the power adjustment channel 126 uniquely allocated for the communication unit 103. In response to the inbound power adjustment information, the processor 107 further instructs the transmitter 106 to adjust the transmission power of the voice information corresponding to the group call, i.e. the transmission power level of the inbound traffic channel 123.

In practice, power adjustment information is sent to a given communication unit as soon as the controller receives a transmission, i.e., via an inbound traffic channel or a low-rate inbound link from the communication unit. Techniques for processing inbound transmissions to derive power adjustment information are well-known in the art. The unique power adjustment information for each communication unit instructs the communication unit, to which it is directed, how to adjust its power on a continuous basis. For example, in accordance with current techniques, the unique power adjustment information for each unit may comprise a periodic stream of single bit flags, where a "0" bit indicates that the unit should increase its transmitted power by a predetermined increment and a "1" bit indicates that the unit should decrease its transmitted power by a predetermined increment.

The communication unit 103, upon stopping the transmission of voice information, allows another member (not shown) of the group 101 to transmit voice information instead. The receiver 105 receives, from BTS 109 of the wireless CDMA communication infrastructure, voice information corresponding to the group call via the voice channel allocated for the group call 121. The communication unit 104 also receives voice information corresponding to the group call via the voice channel 121 allocated for the group call, as would any other communication unit of group 101 that is provided wireless communication services by BTS 109. Upon receiving voice information via voice channel 121 and inbound power adjustment information via the power adjustment channel 126, the processor 107 instructs the transmitter 106 to transmit, via the inbound traffic channel, now simply a low-rate power adjustment channel, 123, outbound power adjustment information corresponding to the voice channel 121 and to the power adjustment channel 126. In response to the inbound power adjustment information (received earlier), the processor 107 further instructs the transmitter 106 to adjust the transmission power of the outbound power adjustment information, i.e. the transmission power level of the inbound traffic/power adjustment channel 123.

FIG. 2 is a logic flow diagram 200 of steps executed by a wireless CDMA communication infrastructure in accordance with a preferred embodiment of the present invention. The logic flow begins (202) when the communication infrastructure receives (204), from a requesting communication unit of a group, a request for a group call with other communication units of the group. The request for a group call specifies at least the talkgroup for which the call is intended. Typically, the group call request can be originated by a communication unit that is a member of the targeted talkgroup or by any communication device with access to the communication infrastructure, such as a telephone (not shown), wishing to establish communications with the talkgroup.

In response to the group call request, the communication infrastructure allocates (206) a single voice channel for the group call at each BTS that is providing communication service to at least one communication unit of the group. Further, the communication infrastructure allocates (208) a power adjustment channel for the group call for each communication unit of the group at the BTS that is providing communication service to that communication unit. Thus, one voice channel is allocated at each BTS to provide the communication unit(s) of the group, in that BTS's coverage area, voice information for the group call. Additionally, one power adjustment channel is allocated for each communication unit of the group to provide unique power adjustment information for that communication unit.

The communication infrastructure notifies (210) each communication unit of the group of the identity of the single voice channel allocated for the group call at that communication unit's BTS and notifies (212) each communication unit of the identity of the power adjustment channel allocated for that communication unit. Techniques for accomplishing this notification are well known in the art. For example, in a typical CDMA system, this would be accomplished by transmitting, via a paging channel within a given cell, information that identifies the code allocated for the voice channel and the power adjustment channel. The power adjustment channel identification information would be unique to each communication unit in the group, and assuming the group call requires the use of resources within multiple cells, the power adjustment channel identification information would be unique to each cell (BTS).

The communication infrastructure receives (214) voice information for the group call from a communication unit of the group, i.e., the transmitting communication unit. The voice information is then sent (216) to the communication units of the group via the single voice channel allocated for the group call at each BTS.

The communication infrastructure then receives (218) from each communication unit of the group unique power adjustment information corresponding to the single voice channel allocated for the group call at the BTS that is providing communication service to that communication unit. In response to the unique power adjustment information received from each communication unit, the communication infrastructure adjusts (220) the transmission power of the single voice channel at each base transceiver system that is providing communication service to at least one communication unit of the group. Since each BTS is potentially receiving power adjustment information from multiple communication units of the group, the transmission power of a BTS's voice channel is preferably increased only when one or more communication units of the group indicates that greater transmit power of the BTS's voice channel is needed.

In response to the unique power adjustment information received from each communication unit, the communication infrastructure sends (222) to each communication unit of the group unique power adjustment information via the power adjustment channel allocated for that communication unit. This power adjustment information corresponds to the power level of the received power adjustment information from each communication unit. The communication infrastructure further receives (224), from each communication unit of the group, unique power adjustment information corresponding to the power adjustment channel allocated for that communication unit. In response to the unique power adjustment information corresponding to the power adjustment channel, the communication infrastructure adjusts (226) the transmission power of the power adjustment channel allocated for that communication unit.

Thus, the communication infrastructure transmits information via both the voice channels and the power adjustment channels, and each communication unit transmits power adjustment information for both channels back to the communication infrastructure. The communication infrastructure, in return, transmits power adjustment information to each communication unit for the communication unit's transmission to the communication infrastructure. This cycle (steps 214–226) continues as voice information continues to be received (214).

FIG. 3 is a logic flow diagram 300 of steps executed by a communication unit in accordance with a preferred embodiment of the present invention. The logic flow begins (302) when the communication unit transmits (304) a request for a group call to the wireless CDMA communication infrastructure. As the transmitting communication unit of the group call, the communication unit then transmits (306) voice information corresponding to the group call to the wireless CDMA communication infrastructure. In response to the transmission of voice information, the communication unit receives (308) inbound power adjustment information from the wireless CDMA communication infrastructure via a power adjustment channel uniquely allocated for the communication unit. The communication unit responds to the inbound power adjustment information by adjusting (310) the transmission power of the voice information corresponding to the group call that the communication unit continues to transmit. This cycle (steps 306–312) continues as the communication unit continues to transmit (306) voice information.

When (312) the communication unit stops the transmission of voice information, however, another member of the group is able to become the transmitting communication unit. When another member of the group thus begins transmitting voice information, the communication unit receives (314) the voice information corresponding to the group call from the wireless CDMA communication infrastructure. The voice information is received via the voice channel allocated for the group call in the communication unit's cell. In response to receiving information via both the voice channel and the power adjustment channel, the communication unit transmits (316) outbound power adjustment information corresponding to the voice channel and to the power adjustment channel to the wireless CDMA communication infrastructure. In response to the transmission of outbound power adjustment information, the communication unit receives (318) inbound power adjustment information from the wireless CDMA communication infrastructure via the power adjustment channel uniquely allocated for the communication unit. Further, in response to the inbound power adjustment information, the communication unit adjusts (320) the transmission power of the outbound power adjustment information that continues to be transmitted. As with the transmit cycle above, the communication unit cycles through steps 314–320 while continuing to receive (314) voice information corresponding to the group call.

The present invention generally provides reliable and efficient reverse power control for group call communication in CDMA systems. The use of a single voice channel per cell for transmitting group call voice information is clearly an efficient use of energy and spectrum. The use of a low-rate power control channel per communication unit for group calls provides the power control feedback to individual communication units required for a reliable CDMA system. Further, the present invention provides a means for implementing group call functionality in a CDMA system without radically departing from existing CDMA architectures. Thus, the present invention addresses the need for providing reliable and efficient reverse power control for group call communication in CDMA systems.

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a wireless CDMA communication infrastructure to establish a group call, wherein the wireless CDMA communication infrastructure comprises a plurality of base transceiver systems, and wherein each base transceiver system, of the plurality of base transceiver systems, provides wireless communication service to any communication unit, of a plurality of communication units, that is in the service coverage area of that base transceiver system, the method comprising the steps of:

receiving, from a requesting communication unit of a group, a request for a group call with other communication units of the group, wherein at least a subset of the plurality of communication units are logically arranged into the group;

allocating a single voice channel for the group call at each base transceiver system of the plurality of base transceiver systems that is providing communication service to at least one communication unit of the group, wherein the voice channel at each base transceiver system is allocated for the conveyance of non-power-adjustment information exclusively; and allocating a power adjustment channel for the group call for each communication unit of the group at the base transceiver system, of the plurality of base transceiver systems, that is providing communication service to that communication unit, wherein the power adjustment channel for each communication unit of the group is allocated for the conveyance of power adjustment information exclusively.

2. The method of claim 1, further comprising the step of notifying each communication unit of the group of the identity of the single voice channel allocated for the group call.

3. The method of claim 1, further comprising the step of notifying each communication unit of the group of the identity of the power adjustment channel allocated for that communication unit.

4. The method of claim 1, further comprising the step of sending to each communication unit of the group power adjustment information via the power adjustment channel allocated for that communication unit.

5. The method of claim 1, further comprising a step of sending voice information to the communication units of the group via the single voice channel allocated for the group call at each base transceiver system, of the plurality of base transceiver systems, that is providing communication service to at least one communication unit of the group.

6. The method of claim 1, further comprising the steps of:

receiving, from each communication unit of the group, power adjustment information corresponding to the single voice channel allocated for the group call at the base transceiver system that is providing communication service to that communication unit; and receiving, from each communication unit of the group, power adjustment information corresponding to the power adjustment channel allocated for that communication unit.

7. The method of claim 6, further comprising the step of adjusting, responsive to the power adjustment information received from each communication unit of the group, transmission power of the single voice channel at each base transceiver system that is providing communication service to at least one communication unit of the group.

8. The method of claim 7, further comprising the step of increasing the transmission power of the single voice channel at a base transceiver system, of the plurality of base transceiver systems, when at least one communication unit of the group indicates that greater transmit power of the single voice channel at the base transceiver system is needed.

9. The method of claim 6, further comprising the step of adjusting, responsive to the power adjustment information from each communication unit of the group, transmission power of the power adjustment channel allocated for that communication unit.

10. The method of claim 1, further comprising the step of receiving from a communication unit of the group voice information for the group call.

11. A method for a communication unit of a plurality of communication units that are logically arranged into a group to participate in a group call with the other communication units of the group, wherein a wireless CDMA communication infrastructure provides wireless communication service to the communication unit, the method comprising steps of:

receiving, from the wireless CDMA communication infrastructure, voice information corresponding to a group call via a voice channel allocated for the group call, wherein the voice channel was allocated for the conveyance of non-power-adjustment information exclusively;

receiving, from the wireless CDMA communication infrastructure, inbound power adjustment information via a power adjustment channel allocated for the communication unit, wherein the power adjustment channel and the voice channel are separate CDMA channels and wherein the power adjustment channel was allocated for the conveyance of power adjustment information exclusively; and transmitting, to the wireless CDMA communication infrastructure, outbound power adjustment information corresponding to the voice channel and to the power adjustment channel.

12. The method of claim 11, further comprising the step of transmitting, to the wireless CDMA communication infrastructure, a request for the group call.

13. The method of claim 11, further comprising the step of adjusting, responsive to the inbound power adjustment information, transmission power of the outbound power adjustment information.

14. The method of claim 11, further comprising the step of transmitting, to the wireless CDMA communication infrastructure, voice information corresponding to the group call.

15. The method of claim 14, further comprising the step of adjusting, responsive to the inbound power adjustment information, transmission power of the voice information corresponding to the group call.

16. A wireless CDMA communication infrastructure comprising:

a first base transceiver system capable of receiving, from a requesting communication unit of a group of communication units, a request for a group call with the other communication units of the group;

a second base transceiver system capable of providing wireless communication services to at least one communication unit of the group of communication units; and a controller, coupled to the first base transceiver system and the second base transceiver system, capable of allocating a single voice channel for the group call at the first base transceiver system and a single voice channel at the second base transceiver system, and capable of allocating a single power adjustment channel for the group call for each communication unit of the group, wherein the voice channel at the first base transceiver system and the voice channel at the second base transceiver system are allocated for the conveyance of non-power-adjustment information exclusively and wherein the power adjustment channel for each communication unit of the group is allocated for the conveyance of power adjustment information exclusively.

17. A communication unit comprising:

a transmitter;

a receiver capable of receiving, from a wireless CDMA communication infrastructure, voice information corresponding to a group call via a voice channel allocated for the group call, and capable of receiving, from the wireless CDMA communication infrastructure, inbound power adjustment information via a power adjustment channel allocated for the communication unit, wherein the power adjustment channel and the voice channel are separate CDMA channels, wherein the voice channel was allocated for the conveyance of non-power-adjustment information exclusively, and wherein the power adjustment channel was allocated for the conveyance of power adjustment information exclusively; and a processor, coupled to the transmitter and the receiver, capable of instructing the transmitter to transmit, to the wireless CDMA communication infrastructure, outbound power adjustment information corresponding to the voice channel and to the power adjustment channel.

18. The communication unit of claim 17, wherein the processor is further capable of instructing the transmitter to adjust, responsive to the inbound power adjustment information, transmission power of the outbound power adjustment information.

19. The communication unit of claim 17, wherein the processor is further capable of instructing the transmitter to transmit, to the wireless CDMA communication infrastructure, voice information corresponding to the group call.

20. The communication unit of claim 17, wherein the processor is further capable of instructing the transmitter to adjust, responsive to the inbound power adjustment information, transmission power of the voice information corresponding to the group call.

* * * * *